(12) United States Patent
Bouguet et al.

(10) Patent No.: US 9,400,921 B2
(45) Date of Patent: Jul. 26, 2016

(54) METHOD AND SYSTEM USING A DATA-DRIVEN MODEL FOR MONOCULAR FACE TRACKING

(75) Inventors: Jean-Yves Bouguet, Milpitas, CA (US); Radek Grzeszczuk, Mountain View, CA (US); Salih Gokturk, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 09/852,398

(22) Filed: May 9, 2001

(65) Prior Publication Data
US 2003/0012408 A1    Jan. 16, 2003

(51) Int. Cl.
 *G06K 9/00* (2006.01)
 *G06T 7/20* (2006.01)
 *G06T 17/00* (2006.01)
 *H04N 19/597* (2014.01)
 *H04N 13/00* (2006.01)
 *H04N 13/02* (2006.01)

(52) U.S. Cl.
CPC .......... *G06K 9/00228* (2013.01); *G06T 7/2046* (2013.01); *G06T 17/00* (2013.01); *H04N 19/597* (2014.11); *G06T 2207/10016* (2013.01); *G06T 2207/30201* (2013.01); *H04N 13/0055* (2013.01); *H04N 13/0239* (2013.01); *H04N 2013/0081* (2013.01)

(58) Field of Classification Search
USPC .................. 382/103, 118, 154, 203, 243, 255; 345/419, 420, 427, 473, 474; 348/169, 348/170; 356/12, 14
See application file for complete search history.

(56) References Cited

U.S. PATENT DOCUMENTS

| | | | | |
|---|---|---|---|---|
| 6,047,078 A * | 4/2000 | Kang | ............................. | 382/107 |
| 6,072,496 A * | 6/2000 | Guenter | ............. | G06K 9/00201 345/419 |
| 6,163,322 A * | 12/2000 | LaChapelle | ............. | G06T 13/40 345/473 |
| 6,198,485 B1 * | 3/2001 | Mack | ...................... | G06F 3/013 345/156 |
| 6,200,139 B1 * | 3/2001 | Clapper | .................. | G09B 9/042 434/62 |
| 6,272,231 B1 * | 8/2001 | Maurer | .............. | G06K 9/00228 382/103 |

(Continued)

FOREIGN PATENT DOCUMENTS

EP        0 807 902 A      11/1997
WO    PCT/US 02/14014      7/2003

OTHER PUBLICATIONS

Kumar et al., "3D Model Acquisition from Monocular Image Sequences," IEEE 1992.*

(Continued)

*Primary Examiner* — Aaron W Carter
(74) *Attorney, Agent, or Firm* — Blakely, Sokoloff, Taylor & Zafman LLP

(57) ABSTRACT

A method and system using a data-driven model for monocular face tracking are disclosed, which provide a versatile system for tracking three-dimensional (3D) images, e.g., a face, using a single camera. For one method, stereo data based on input image sequences is obtained. A 3D model is built using the obtained stereo data. A monocular image sequence is tracked using the built 3D model. Principal Component Analysis (PCA) can be applied to the stereo data to learn, e.g., possible facial deformations, and to build a data-driven 3D model ("3D face model"). The 3D face model can be used to approximate a generic shape (e.g., facial pose) as a linear combination of shape basis vectors based on the PCA analysis.

12 Claims, 8 Drawing Sheets

(56) References Cited

U.S. PATENT DOCUMENTS

| | | | | |
|---|---|---|---|---|
| 6,301,370 B1* | 10/2001 | Steffens | ............. | G06K 9/00228 342/90 |
| 6,381,346 B1* | 4/2002 | Eraslan | ............. | G06K 9/00221 345/420 |
| 6,532,011 B1* | 3/2003 | Francini | ............. | G06K 9/00268 345/420 |
| 6,556,196 B1* | 4/2003 | Blanz | ................ | G06K 9/00275 345/419 |
| 6,614,428 B1* | 9/2003 | Lengyel | ................. | G06T 9/001 345/420 |
| 6,757,086 B1* | 6/2004 | Mori | ....................... | G03H 1/02 348/43 |
| 6,775,403 B1* | 8/2004 | Ban | .................... | G06K 9/00201 382/118 |
| 6,850,872 B1* | 2/2005 | Marschner | ........... | G06K 9/4661 703/1 |
| 6,862,374 B1* | 3/2005 | Nagai | ..................... | G06T 17/00 345/419 |
| 6,919,892 B1* | 7/2005 | Cheiky | .................... | G06T 13/40 345/473 |
| 6,950,104 B1* | 9/2005 | Marschner | ............. | G06T 13/40 345/473 |
| 7,027,054 B1* | 4/2006 | Cheiky | ................... | H04N 5/262 345/473 |
| 7,127,081 B1* | 10/2006 | Erdem | ............... | G06K 9/00228 348/169 |
| 7,149,329 B2* | 12/2006 | Liu | .................... | G06K 9/00201 375/E7.084 |
| 7,457,457 B2* | 11/2008 | Ives | .................. | G06K 9/00221 345/419 |
| 2002/0012454 A1* | 1/2002 | Liu | .................... | G06K 9/00201 382/118 |
| 2002/0024519 A1* | 2/2002 | Park | ........................ | G06T 13/40 345/474 |
| 2002/0106114 A1* | 8/2002 | Yan | .................... | G06K 9/00288 382/118 |
| 2003/0012408 A1* | 1/2003 | Bouguet | ............ | G06K 9/00228 382/103 |
| 2003/0206645 A1* | 11/2003 | Okazaki | ............. | G06K 9/00221 382/117 |
| 2006/0012601 A1* | 1/2006 | Francini | .................. | G06T 13/40 345/473 |
| 2010/0007665 A1* | 1/2010 | Smith | ..................... | G06T 13/40 345/473 |
| 2011/0115798 A1* | 5/2011 | Nayar | ..................... | G06T 13/40 345/473 |

OTHER PUBLICATIONS

Ray, "Estimation of Modeled Object Pose from Monocular Images," IEEE 1990.*

Y.S. Akgul and C. Kambhamettu, "Recovery and tracking of continuous 3d surfaces from stereo data using a deformable dual-mesh", Computer Vision, 1999. The Proceedings of the Seventh IEEE International Conference on, 2:765-772, 1999.

J. Barron, D. Fleet, and S. Beauchemin, "Performance of optical flow techniques", Int. J. of Computer Vision, 12(1):43-78, 1994.

C. Bregler, A. Hertzmann, and H. Biermann, "Recovering non-rigid 3d shape from image streams", Proceedings CVPR '00, 2:690-696, 2000.

D. DeCarlo and D. Metaxas, "Deformable model-based face shape and motion estimation". Automatic Face and Gesture Recognition, 1996, Proceedings of the Second International Conference on, pp. 146-150, 1996.

D. DeCarlo and D. Metaxas, "The integration of optical flow and deformable models with applications to human face shape and motion estimation", Proceedings CVPR '96, pp. 231-238, 1996.

O.D. Faugeras, "Tracking Tokens over Time", Three dimensional vision, a geometric viewpoint, pp. 301-340, MIT Press, 1993.

Berthold K.P. Horn, "Motion Field & Optical Flow", Robot Vision, pp. 278-298, MIT Press, 1986.

T. Horprasert, Y. Yacoob, and L.S. Davis, "Computing 3-d head orientation from a monocular image sequence", Automatic Face and Gesture Recognition, 1996, Proceedings of the Second International Conference on, pp. 242-247, 1996.

Sang-Jean Lee, Sang-Bong Jung, Jong-Woo Kwon, and Seung-Hong Hong, "Face detection and recognition using pca", TENCON 99. Proceedings of the IEEE Region 10 Conference, 1:84-87, 1999.

B.D. Lucas and T. Kanade, "An iterative image registration technique with an application to stereo vision", Proc. 7th Int. Conf. on Art. Intell., 1981.

P.S. Penev and L. Sirovich, "The global dimensionality of face space", Automatic Face and Gesture Recognition, 2000, Proceedings. Fourth IEEE International Conference on, pp. 264-270, 2000.

S. Romdhani, Psarrou A., and S. Gong. "Learning a single active face shape model across views." Recognition, Analysis, and Tracking of Faces and Gestures in Real-Time Systems, 1999. Proceedings. International Workshop on, pp. 31-38, 1999.

Jianbo Shi and Carlo Tomasi "Good features to track", Proc. IEEE Comput. Soc. Conf. Comput. Vision and Pattern Recogn., pp. 593-600, 1994.

Guenter, B., et al., "Making Faces", Computer Graphics, Jul. 19, 1998, pp. 55-66, SigGraph '98 Conference Proceedings, (XP-002205956).

Kouadio, C., et al., "Real-time Facial Animation Based Upon a Bank of 3D Facial Expression", Jun. 8, 1998, pp. 128-136, Computer Animation '98 Proceedings, (XP-010285090).

* cited by examiner

METHOD AND SYSTEM USING A DATA-DRIVEN MODEL FOR MONOCULAR FACE TRACKING

FIELD OF THE INVENTION

The present invention relates generally to the field of image processing. More particularly, the present invention relates to a method and system using a data-driven model for monocular face tracking.

BACKGROUND OF THE INVENTION

Monocular face tracking is the process of estimating facial motion, position, and shape based on monocular image sequences from a stationary camera. Monocular face tracking is a main process in many image processing systems such as a video conferencing system. For instance, in a video conferencing system, by estimating facial motion or position, the amount of facial data or information that needs to be exchanged or processed is reduced. That is, parameters related to the estimated facial motion, position, and shape can be exchanged or processed for outputting an image sequence instead of exchanging or processing large amounts of image data.

One type of face tracking system is a face tracking system based on markers ("marker face tracking system"). In a marker face tracking system, a user is required to wear color "markers" at known locations. The movement of the markers are thus parameterized to estimate facial position and shape. A disadvantage of the marker face tracking system is that it is invasive on the user. In particular, the user must place a number of color markers on varying positions of the face. Furthermore, the user must spend time putting on the markers, which adds a further complexity to using such a system.

Another type of face tracking system is a model-based face tracking system. A model-based face tracking system uses a parameterized face shape model that can be used to estimate facial position and motion. In prior model-based face tracking systems, parameterized models are built using a manual process, e.g., by using a 3D scanner or a computer aided design (CAD) modeler. Hence, a disadvantage of prior model-based face tracking systems is that manual building of face shape models is very ad-hoc, which leads to a trial and error approach to obtain tracking models. Such an ad-hoc process provides inaccurate and suboptimal models.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

A method and system using a data-driven model for monocular face tracking are described, which provide a versatile system for tracking a three-dimensional (3D) object, e.g., a face, in an image sequence acquired using a single camera. In one embodiment, stereo data based on input image sequences is obtained. A 3D model is built using the obtained stereo data. A monocular image sequence is tracked using the built 3D model. In one embodiment, Principal Component Analysis (PCA) is applied to the stereo data to learn, e.g., possible facial deformations, and to build a data-driven 3D model ("3D face model"). The 3D face model can be used to approximate a generic shape (e.g., facial pose) as a linear combination of shape basis vectors based on the PCA analysis.

By using real stereo, a small number of shape basis vectors can be computed to build the 3D model, which provides a number of advantages. For instance, only a small number (e.g., 3 or 4) of shape basis vectors can be used to span, e.g., a variety of facial expressions such as smiling, talking, raising eyebrows, and etc. Furthermore, a 3D model can be built and stored in a database using stereo data from one or more users in which, e.g., a face of a new user can be tracked even though stereo data from the new user is not stored in the database.

In addition, by building a 3D model using stereo data based on input image sequences, monocular face tracking of pose and deformation of the face can be achieved without use of invasive markers. The 3D face model described herein provides a low complexity deformable model for simultaneous tracking of pose and deformation of the face from a single image sequence ("monocular tracking").

The following embodiments describes a system that tracks both 3D pose and shape of a facial image ("face") in front of a single video camera without using intrusive markers. The system also provides robust and accurate monocular tracking using a data-driven model. Furthermore, the system also provides generalization properties to enable face tracking of multiple persons with the same 3D model.

In the following description, monocular tracking techniques are described with respect to tracking of a 3D facial image. Nevertheless, the monocular tracking techniques described herein are not intended to be limited to any particular type of image and can be implemented with other types of 3D images such as moving body parts or inanimate objects.

GENERAL OVERVIEW

Exemplary Computing System

Figure 1:
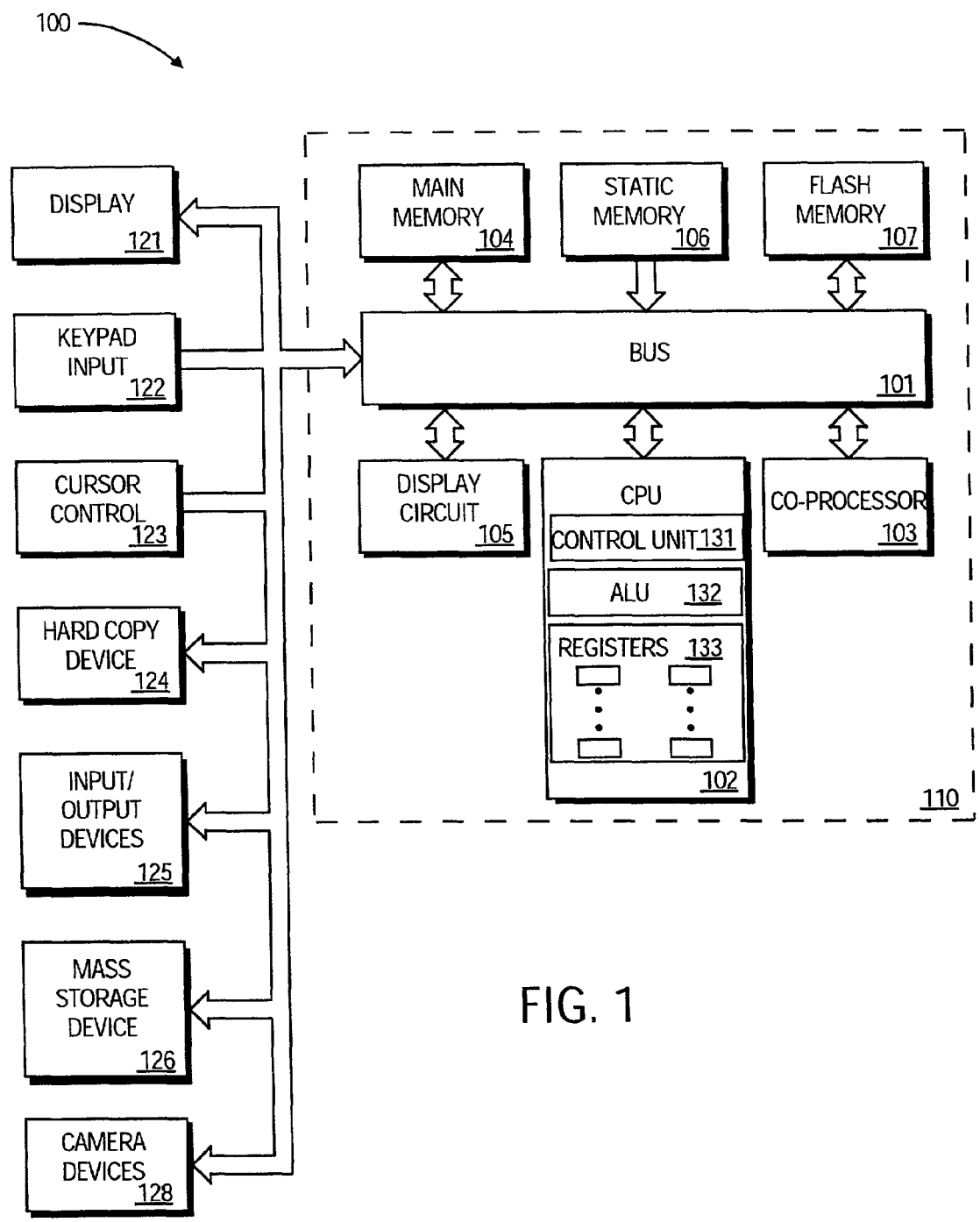
FIG. 1 illustrates an exemplary computing system for practicing the present invention.

FIG. 1 illustrates an exemplary computing system 100 for practicing the present invention. The 3D model building techniques and monocular tracking techniques described herein can be implemented and utilized by computing system 100. Computing system 100 can represent, for example, a general purpose computer, workstation, portable computer, hand-held computing device, or other like computing device. The components of computing system 100 are exemplary in which one or more components can be omitted or added. For example, a plurality of camera devices 128 can be used with computing system 100.

Referring to FIG. 1, computing system 100 includes a main unit 110 having a central processing unit (CPU) 102 and a co-processor 103 coupled to a display circuit 105, main memory 104, static memory 106, and flash memory 107 via bus 101. Main unit 110 of computing system 100 can also be coupled to a display 121, keypad input 122, cursor control 123, hard copy device 124, input/output (I/O) devices 125, and mass storage device 126, and camera devices 128 via bus 101.

Bus 101 is a standard system bus for communicating information and signals. CPU 102 and co-processor 103 are processing units for computing system 100. CPU 102 or co-processor 103 or both can be used to process information and/or signals for computing system 100. CPU 102 can be used to process code or instructions to perform the 3D data-driven model building techniques and monocular tracking techniques described herein. Alternatively, co-processor 103 can be used to process code or instructions to perform same techniques as CPU 102. CPU 102 includes a control unit 131, an arithmetic logic unit (ALU) 132, and several registers 133, which can be used by CPU 102 for data and information processing purposes. Co-processor 103 can also include similar components as CPU 102.

Main memory 104 can be, e.g., a random access memory (RAM) or some other dynamic storage device, for storing data, code, or instructions to be used by computing system 100. In one embodiment, main memory 104 can store data related to input stereo image sequences and/or a 3D data-driven model as will be described in further detail below. Main memory 104 may also store temporary variables or other intermediate data during execution of code or instructions by CPU 102 or co-processor 103. Static memory 106, can be, e.g., a read only memory (ROM) and/or other static storage devices, which can store data and/or code or instructions to be used by computing system 100. Flash memory 107 is a memory device that can be used to store basic input/output system (BIOS) code or instructions for computing system 100.

Display 121 can be, e.g., a cathode ray tube (CRT) or liquid crystal display (LCD). Display device 121 can display images, information, or graphics to a user. Main unit 110 of computing system 100 can interface with display 121 via display circuit 105. Keypad input 122 is a alphanumeric input device for communicating information and command selections for computing system 100. Cursor control 123 can be, e.g., a mouse, touchpad, trackball, or cursor direction keys, for controlling movement of an object on display 121. Hard copy device 124 can be, e.g., a laser printer, for printing information on paper, film, or some other like medium. Any number of input/output (I/O) devices 125 can be coupled to computing system 100. For example, an I/O device such as a speaker can be coupled to computing system 100. Mass storage device 126 can be, e.g., a hard disk, read/writable CD or DVD player, or other large volume storage device. Camera devices 128 can be video image capturing devices, which can be used for the image processing techniques described herein. In one embodiment, camera devices 128 include Digiclops™ camera systems, which provide an average frame rate of 4 fps with color images having a size 640×480.

In one embodiment, the 3D data-driven model building techniques and monocular tracking techniques described herein can be performed by the hardware and/or software modules contained within computing system 100. For example, CPU 102 or co-processor 103 can execute code or instructions stored in a machine-readable medium, e.g., main memory 104 or static memory 106, to process stereo input sequences to build a 3D data-driven model as described herein. Furthermore, CPU 102 or co-processor 103 can execute code or instruction to track monocular input images using the 3D data-driven model as described herein. The memory devices within main unit 110 can also be A machine-readable medium may include a mechanism that provides (i.e., stores and/or transmits) information in a form readable by a machine such as computer or digital processing device. For example, the machine-readable medium may include a read only memory (ROM), random access memory (RAM), magnetic disk storage media, optical storage media, flash memory devices, or other like memory devices. The code or instructions can be represented by carrier wave signals, infrared signals, digital signals, and by other like signals. A machine-readable medium can also be used to store a database for the 3D data-driven model described herein. Furthermore, one or more machine-readable mediums can be used to store the 3D model.

Basic Operation

Figure 2:
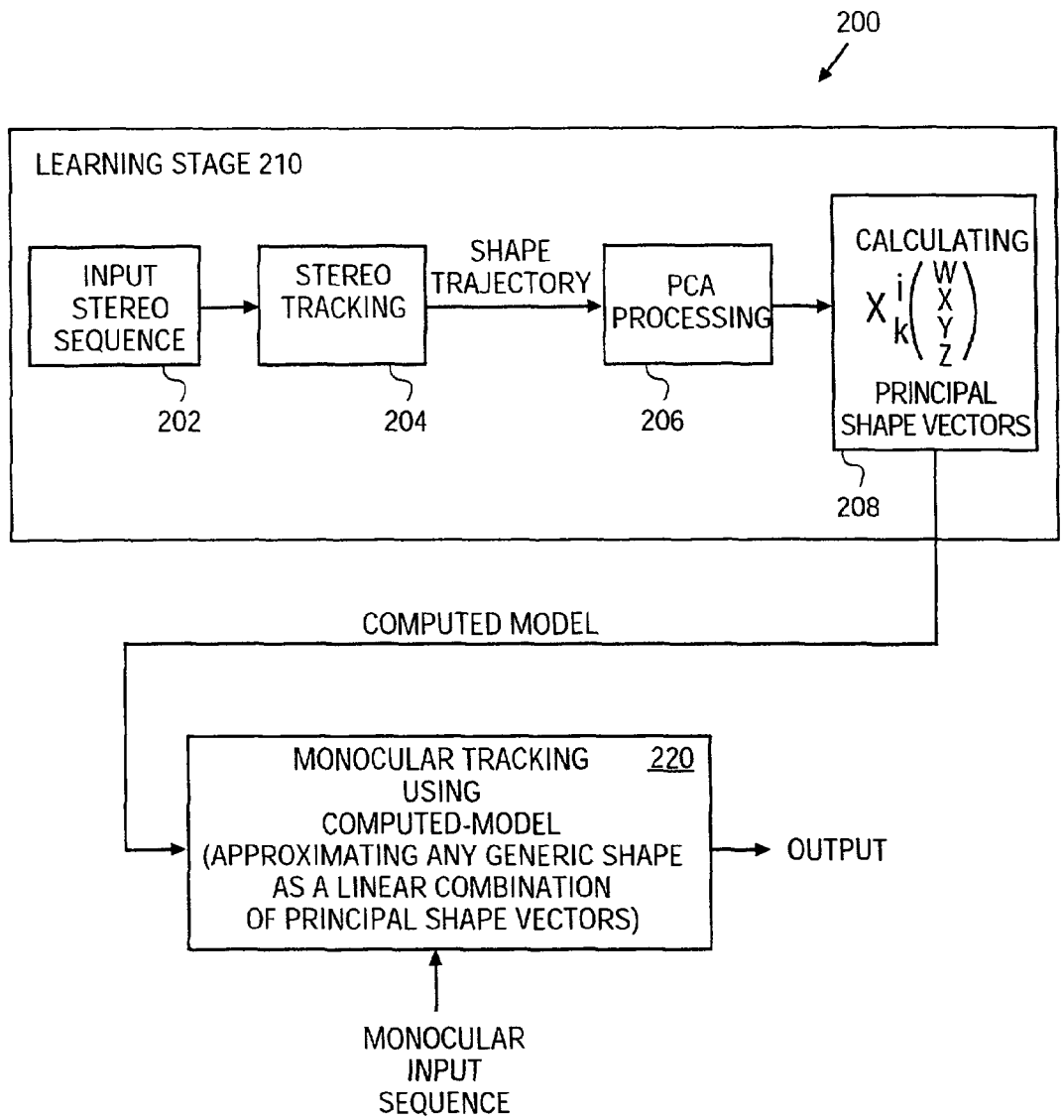
FIG. 2 illustrates a flow diagram of an operation to perform monocular tracking using a data-driven model according to one embodiment.

FIG. 2 illustrates a functional flow diagram of an operation 200 for performing monocular tracking using a data-driven model according to one embodiment. Referring to FIG. 2, operation 200 includes two stages. The first stage refers to operation block 210 or learning stage 210. Learning state 210 learns the space of possible facial deformations by applying Principal Component Analysis (PCA) processing on real stereo tracking data to build a 3D data-driven model for monocular tracking. The 3D data-driven model can be used to approximate a generic shape as a linear combination of shape basis vectors. The second stage refers to operation block 220 in which monocular tracking is performed using the 3D data-driven model built in the learning stage. By using the 3D data-driven model, pose and deformation of an image, e.g., a face, can be tracked together from a monocular or single image sequence. Initially, operation 200 begins with the learning stage 210.

Figure 3:
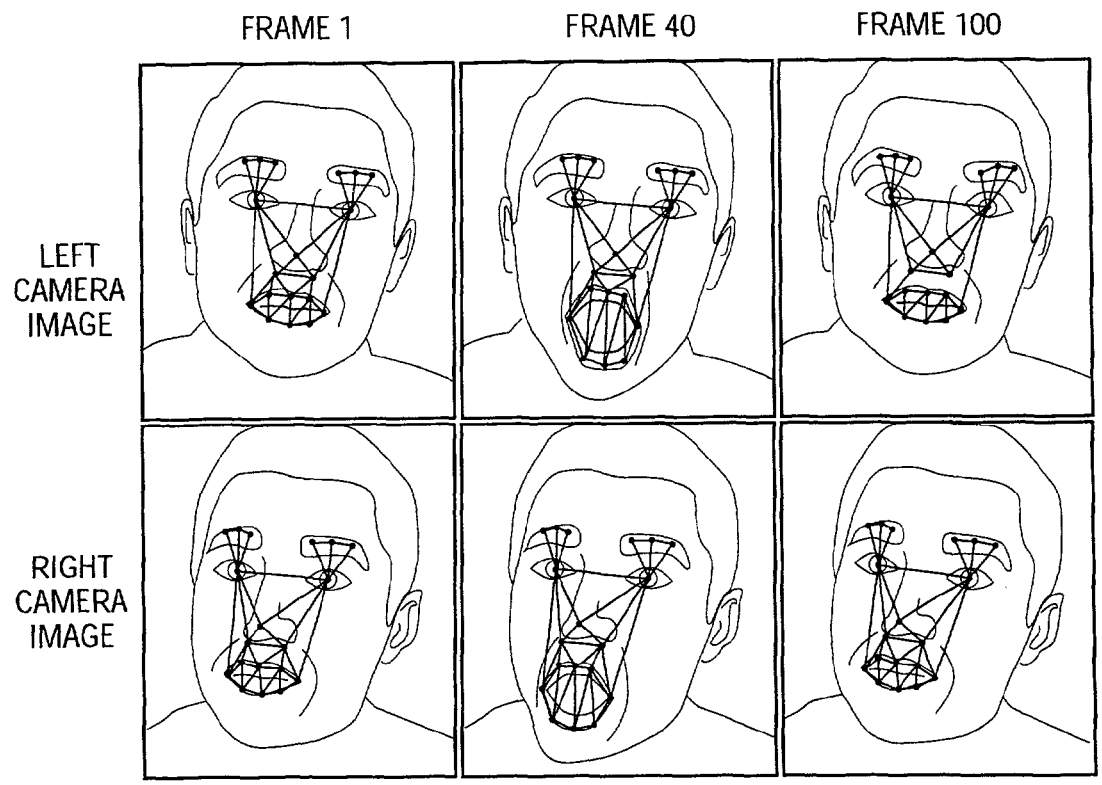
FIG. 3 illustrates exemplary stereo input image sequences for stereo tracking to build the data-driven model of FIG. 2.

Within the learning stage 210, at operation block 202, a stereo sequence is inputted. For example, camera devices 128 can include a first camera and a second camera to capture images sequences from a left perspective and a right perspective such as that shown in FIG. 3. As shown in FIG. 3, a first and second camera can capture images sequences, e.g., frame 1 to 100, of a person exhibiting varying facial movement and poses from a left and right perspective. The stereo input sequences can be inputted into computing system 100 for processing.

At operation block 204, the input stereo sequence is tracked. In particular, a low complexity face mesh (e.g., the nineteen points at varying positions of the face as shown in FIG. 3) is initialized and then tracked using standard optical flow techniques. In order to handle non-rigid deformations of a face, each point is tracked independently to obtain a facial shape trajectory.

At operation block 206, a Principal Component Analysis (PCA) processing is initiated on the shape trajectory obtained from the tracked input stereo sequences. PCA is a mathematical process for optimally estimating low-dimensional representation of data embedded in a high-dimensional space. The PCA processing is to obtain principal shape vectors for a compact deformable 3D shape model ("3D shape model"), which is used in monocular tracking.

At operation block 208, the principal shape vectors are calculated, which will be explained in further detail below. Once the principal shape vectors are calculated, any facial movement or pose during monocular tracking can be approximated as a linear combination of the principal shape vectors.

Figure 5:
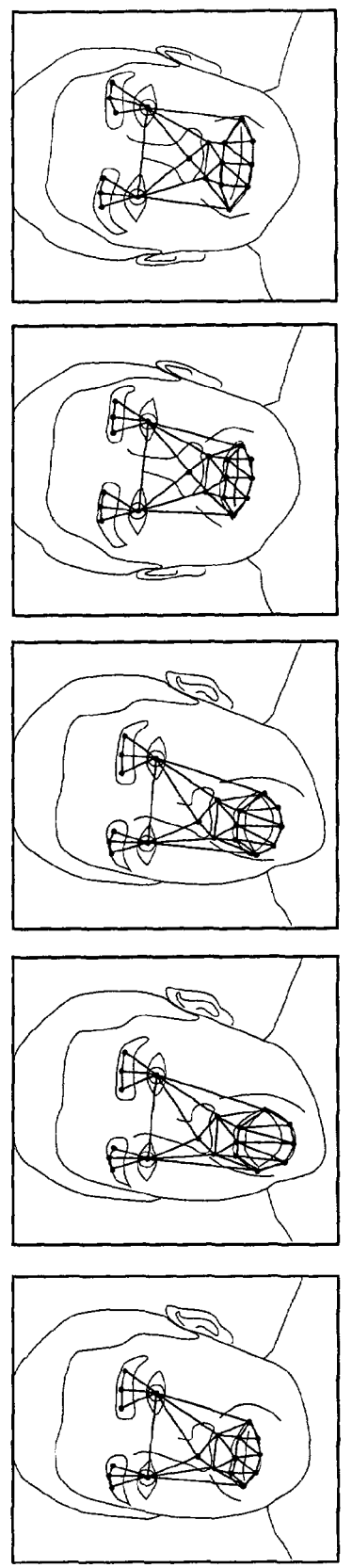
FIG. 5 illustrates exemplary input image sequences for monocular tracking.

At operation 220 (second stage), monocular tracking can be performed on a monocular input sequence using the computed-model. A monocular sequence is a sequence of images from a single camera. For example, as shown in FIG. 5, at each frame of the monocular input sequence (e.g., frames 1 through 72), the shape of the face can be approximated by a linear combination of the principal shape vectors of the computed-model built in the learning stage 210. In particular, while a person changes facial expression and pose, the resulting optical flow information of the sequence can be used with the computed-model to track the changes in pose and facial expression.

The above operation can be implemented within by exemplary computing system 100. For example, CPU 102 can execute code or instructions to build the 3D model and to perform the PCA processing, which will be described in further detail below. The data-driven 3D model can also be stored within memory storage devices of computing system 100. In one embodiment, the data-driven 3D model is a "deformable face model," which will now be described.

Deformable Face Model

The following description describes the parameterization required to create a deformable face model based on stereo tracking data and to monocular tracking the deformable face model. For instance, referring to FIG. 5, the monocular facial sequence can be tracked in 3D space using the deformable face model described herein.

Initially, let $I_n$ be the $n^{th}$ image of the monocular facial sequence, as shown in FIG. 5, having seventy-two frames. A 3D structure of each face in each frame at time n can be represented as a collection of N points $P_n^i (i=1, \ldots, N)$. To perform monocular tracking, coordinate vectors of a face reference frame and a camera reference frame need to be defined. In particular, let $X^i(n)$ and $X_c^i(n) = [X_c^i(n) Y_c^i(n) Z_c^i(n)]^T$ be the coordinate vectors of the point $P_n^i$ in the face reference frame and camera reference frame, respectively.

The vectors $X^i(n)$ and $X_c^i(n)$ are then related to each other through a rigid body transformation characterizing the pose of the user's face with respect to a camera at time n such that:

$$X_c^i(n) = R_n X^i(n) + t_n,$$

where $R_n$ is a 3×3 rotation matrix, and $t_n$ is a translation vector. To track each face of each frame, as shown in FIG. 5, as a non-rigid object, the quantities for $X^i(n)$ for shape and $R_n$ and $t_n$ for pose must be estimated. Because $R_n$ is a rotation matrix, $R_n$ is uniquely parameterized as a 3-vector $\tilde{\omega}_n$, which is known as a rotation vector. The rotation matrix and rotation vector can be related to each other using standard formulas.

The data within the images $I_n$, n=1, 2, ..., M (e.g., frames 1 through 72) can be used to estimate shape and pose for each face in each frame. In particular, let $P_n^i$ be the projection of $P_n^i$ on image $I_n$, and let $x_n^i$ be the image coordinate vector of $P_n^i$. Thus, in one embodiment, a traditional pinhole camera model can be used to determine the image coordinate vector $x_n^i$ for the projection of $P_n^i$ such that:

$$x_n^i = \begin{bmatrix} x_n^i \\ y_n^i \end{bmatrix} = \begin{bmatrix} X_c^i(n)/Z_c^i(n) \\ Y_c^i(n)/Z_c^i(n) \end{bmatrix} \doteq \pi(X^i(n), \tilde{\omega}_n, t_n).$$

Monocular tracking can thus be equivalent to inverting the projection map $\pi$ for recovering the 3D shape $X^i(n)$ and pose $\{\tilde{\omega}_n t_n\}$.

In one embodiment, to perform monocular tracking of non-rigid shapes (e.g., varying facial expressions and poses, the non-rigid shapes can be based on a linear combination of rigid shapes. By basing non-rigid shapes as a linear combination of rigid shapes, dealing with the infinite number of image projection points for varying shape and poses can be avoided. Thus, at any time n in the sequence, the shape coordinate vector $X^i(n)$ may be the sum of a mean shape $X_o^i$ vector and a linear combination of a small number of known shape vectors $X_k^i$ (k=1, ..., p), which are the principal shape basis vectors, as shown in Equation 1 below:

$$X^i(n) = X_o^i + \sum_{k=1}^{p} \alpha_n^k X_k^i, \qquad \text{Equation 1}$$

In Equation 1, p<<3N and the p coefficients $\alpha_n^k$ represent entities that allow for non-rigidity of the 3D shape. If p=0, then the face shape $X^i(n)$ becomes the rigid shape $X_o^i$. Thus, "p" is referred to as the "dimensionality of the deformation space." The image projection map can be reduced to a function of pose parameters $\tilde{\omega}_n$ and $t_n$ and a deformation vector $\overline{\alpha}_n$ having a plurality of "deformation coefficients" such as $$\overline{\alpha}_n = [\alpha_n^1 \alpha_n^2 \alpha_n^p]^T.$$

The image projection map can thus be calculated using Equation 2 as shown below:

$$x_n^i \doteq \pi_i(\overline{\alpha}_n, \tilde{\omega}_n, t_n). \qquad \text{Equation 2}$$

A monocular tracking procedure can thus be performed by combining optical flow constraints (e.g., Lucas-Kanade) with the specific form of the deformable model, which is represented by Equation 1, for simultaneous estimation of the deformation vector $\overline{\alpha}_n$ and the pose parameters $\tilde{\omega}_n$ and $t_n$ at every frame. The monocular tracking procedure is further discussed in detail below.

Prior to performing the monocular tracking procedure, the principal shape basis vectors "$X_k^i$" of Equation 1 must be computed, which is performed in the learning stage 210 as shown in FIG. 2. By using principal shape basis vectors $X_k^i$, a data-driven model can be used that can avoid manual construction of a non-rigid model. The principal shape basis vectors are derived from real 3D tracked data, which is also performed in the learning stage 210 as shown in FIG. 2. In particular, calibrated stereo cameras are used to track in 3D varying facial expressions and poses. For example, a short stereo input sequence (e.g., as shown in FIG. 3) of approximately 100 to 150 frames can be used.

Hence, principal shape basis vectors $X_k^i$ can be computed from the tracked sequence in operation blocks 202 and 204 of FIG. 2 using Principal Component Analysis (PCA) processing, which will be described in detail below. The processing of operation blocks 202 and 204 provide the necessary stereo tracking to capture 3D trajectory data for the purpose of shape deformation analysis.

Stereo Tracking

Figure 6:
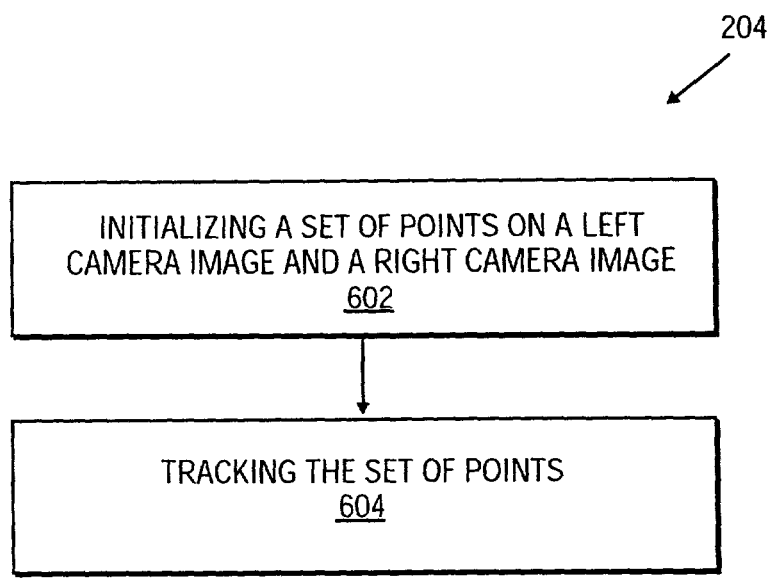
FIG. 6 illustrates a flow diagram of the operation to perform stereo tracking in FIG. 2 according to one embodiment.

FIG. 6 illustrates a flow diagram of the operation 204 of FIG. 2 to perform stereo tracking according to one embodiment. Initially, operation 204 begins at operation block 604.

At operation block 604, a set of points on a left camera image and a right camera image is initialized. In one embodiment, a set of N=19 points $P^i$ located on the eyes (2), nose (3), mouth (8), eyebrow (6) are initialized on the left camera image and the right camera image as shown in FIG. 2. In this operation, varying facial deformations are provided independently from pose such that the user is to maintain head pose as fixed as possible throughout the sequence while making a variety of different facial expressions, e.g., opening/closing mouth, smiling, raising eyebrows, etc. In one embodiment, the set of points are indicated by a user of computing system 100 on the first and left and right camera images. Thus, the stereo image sequence can be tracked using these points.

It should be noted that all the points do not need to fall in textured areas of the image. This is a requirement for independent feature point tracking (to declare a point "good to track," but not for model-based tracking. For example, the point at the tip of nose falls in a totally textureless region, and the points on the outline of the mouth and on the eyebrows are edge features. All those points would be impossible to track individually using traditional optical flow techniques.

At operation block 604, the set of points is tracked by stereo triangulation. The stereo tracking is performed in 3D such that each point location $X_c^i(n)$ (in the left camera reference frame) is updated so that its current left and right image projections are to match approximately a previous image projection (i.e., temporal tracking).

Image Matching Costs

In one embodiment, to maintain stereo correspondence throughout stereo tracking, the left and the right image projections are to match approximately by considering a cost function measured between left and right images. In particular, stereo tracking of the points $P^i$ from frame n-1 to frame n is established by minimizing a cost function $E_i$, which is shown in Equation 3 below.

$$E_i(n) = \sum_{ROI} \begin{Bmatrix} \gamma 1(I_n^L(x_L^i(n)) - I_{n-1}^L(x_L^i(n-1)))^2 + \\ \gamma 2(I_n^R(x_L^i(n)) - I_{n-1}^R(x_R^i(n-1)))^2 + \\ (\gamma 3(I_n^R(x_L^i(n)) - I_{n-1}^L(x_R^i(n-1))))^2 \end{Bmatrix} \quad \text{Equation 3}$$

In Equation 3, $I_n^L$ and $I_n^R$ refer to vectors for the left and the right images at time n, and $x_L^i(n)$ and $x_R^i(n)$ refer to coordinate vectors of the left and right image projections of $P^i$. The summation for $E_i$ is performed around an image point referred to as the region of interest (ROI). The first and second terms of Equation 3 represent traditional image matching costs accounting terms for independent left and right temporal tracking. The third terms is used to maintain correspondence between the right and left images. The three coefficients ($\gamma 1$, $\gamma 2$, and $\gamma 3$) for the three terms are fixed weighting coefficients (i.e., the same for all the points) user for variable reliability between the three terms.

Calculating Weighting Coefficients

In one embodiment, the value for the $\gamma 3$ coefficient is kept smaller than the $\gamma 1$ coefficient and the $\gamma 2$ coefficient and the ratios $\gamma 1/\gamma 3$ and $\gamma 2/\gamma 3$ are typically kept at a ratio value of 20. The values for the $\gamma 1$, $\gamma 2$, $\gamma 3$ coefficients can be hardcoded separately for each of the 19 points on the face mesh as shown in FIG. 2. In one embodiment, each connected pair of points in the face mesh is considered separately. The values for $\gamma 1$, $\gamma 2$, and $\gamma 3$ can be 1, 1, 0.05, respectively, for an average image area of approximately 100 pixels.

Minimizing Energy Function

When applied to all the mesh points, the three weighting coefficients can be used to minimize the global energy function $$E_1(n) = \sum_{i=1}^{N} E_i(n)$$

In this form for the global energy function, stereo tracking works well over short sequences (e.g., up to 20 to 30 frames). For larger stereo sequences, regulation terms can be added to the cost function $E_I(n)$ that allow the overall 3D structure to preserve its integrity while deforming smoothly as a whole throughout the stereo sequence. The total energy cost function E(n) then becomes: $E(n) = E_I(n) + E_T(n) + E_S(n) + E_A(n)$.

The $E_T(n)$ term is a temporal smoothing term, which is used to minimize minimizes the amplitude of 3D velocity at each point. The $E_S(n)$ term is a shape smoothing term, which is used to minimize the differences of velocities of neighboring points. This term guarantees the integrity of the model by weakly enforcing neighbor points to move together. The $E_A(n)$ term is an anthropometric energy cost term, which is used to keep segment lengths as close as possible to their values computed in the first frame and to prevent drifts over long tracking sequences. These three regularization terms are formulated as follows:

$$E_T(n) = \sum_{i=1}^{N} \rho_i \|dX^i(n)\|^2$$

$$E_S(n) = \sum_{i,j} \beta_{ij} \|dX^i(n) - dX^j(n)\|^2$$

$$E_A(n) = \sum_{i,j} \delta_{ij} \left( \begin{array}{c} \|X_c^i(n) - X_c^j(n)\|^2 \\ -\|X_c^i(1) - X_c^j(1)\|^2 \end{array} \right)^2,$$

where $dX^i(n) = X_c^i(n) - X_c^i(n-1)$ and the positive coefficients $\rho_i$, $\beta_{ij}$ and $\delta_{ij}$ vary from point to point and from edge to edge. In one embodiment, all segments $[P^i; P^j]$ that are subject to large stretches are assigned lower $\beta_{ij}$ and $\delta_{ij}$ values. In another embodiment, a point $P^i$ on an highly deformable region of the face will be assigned a small $\rho_i$. In one embodiment, points and segments that are known to be quite rigid will be assigned higher values for $\rho_i$, $\beta_{ij}$ and $\delta_{ij}$ penalizing a lot any movement and stretch applied on them. For example, points and edges on the outline of the mouth will have lower coefficients than points and edges belonging to the nose and eyes. In one embodiment, values for $\rho_i$, $\beta_{ij}$ and $\delta_{ij}$ are approximately 20000, 20000, and 100 for an average area of image feature patch of approximately 100 pixels.

3D Shape Trajectory

The solution shape $X_c^i(n)$, $i=1, \ldots, N$ that minimizes the total energy function E(n) may be calculated by using a gradient descent. That is, by setting the derivative of E(n) with respect to all differential shape coordinate vectors $dX^i(n)$ to zero such that $\partial E(n)/\partial dX^i(n) = 0$. After derivation of the Jacobian matrix, the solution for shape tracking reduces to a linear equation: $dX = D^{-1}e$, where dX is a 3N×1 column vector consisting of all N vectors $dX^i(n)$ and D and e are a 3N×3N matrix and a 3N×1 vector respectively. Once dX is computed, the shape $X_c^i(n)$ is known. The same process is repeated throughout the stereo sequence to obtain finally a complete 3D shape trajectory.

Principal Shape Vector Calculation

Figure 7:
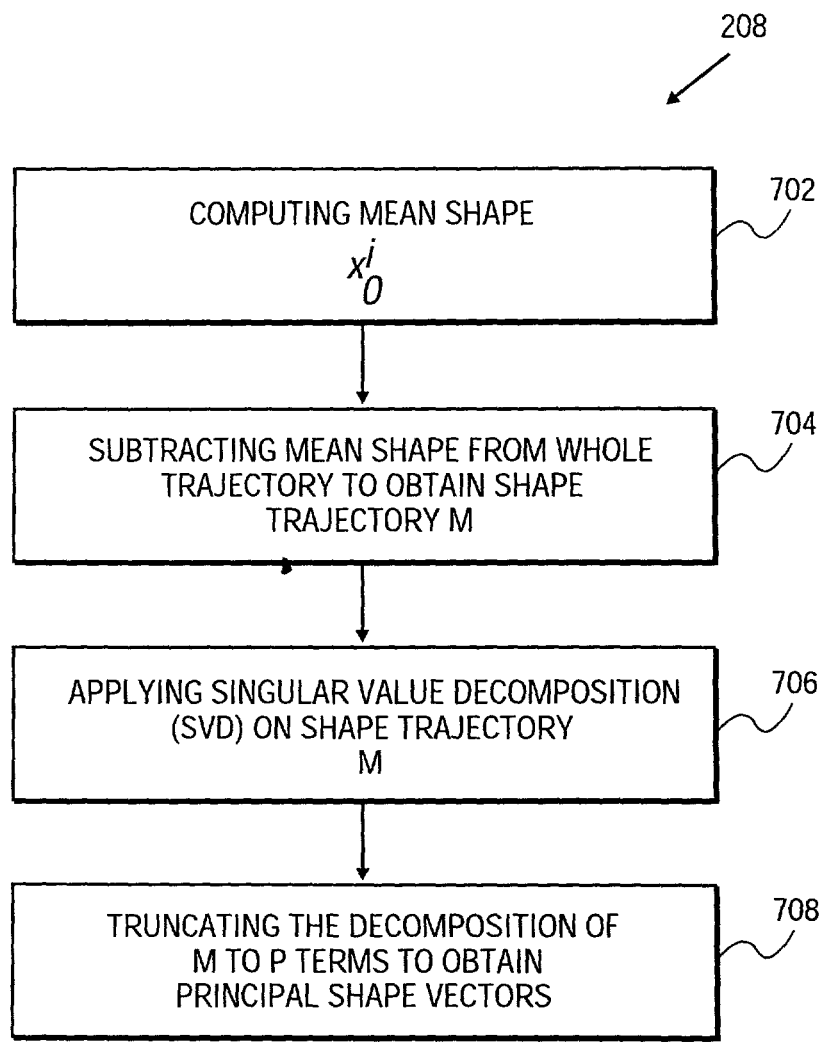
FIG. 7 illustrates a flow diagram to calculate principal shape vectors in FIG. 2 according to one embodiment.

FIG. 7 illustrates a flow diagram of the operation 208 of FIG. 2 to calculate principal shape vectors according to one embodiment. Initially, operation 208 begins at operation block 702.

At operation 702, the mean shape $X_o^i$ is computed. In particular, the outcome of stereo tracking is the 3D trajectory of each point $P^i$ in the left camera reference frame: $X_c^i(n) = [X_c^i(n) Y_c^i(n) Z_c^i(n)]^T$, for n=1, ..., M where M is the number of frames in the sequence. The p+1 shape basis vectors $X_k^i$ are computed using Singular Value Decomposition (SVD). First, the mean shape $X_o^i$ is computed as:

$$X_o^i = \frac{1}{M} \sum_{n=1}^{M} X_c^i(n).$$

At operation 704, the mean shape $X_o^i$ is subtracted from the whole trajectory: $X_c^i(n) = X_c^i(n) - X_o^i$. The resulting shape trajectory $X^i(n)$ is then stored in a 3N×M matrix ("M").

$$M = \begin{bmatrix} X_c^1(1) & X_c^1(2) & \ldots & X_c^1(M) \\ X_c^2(1) & X_c^2(2) & \ldots & X_c^2(M) \\ \vdots & \vdots & \ddots & \vdots \\ X_c^N(1) & X_c^N(2) & \ldots & X_c^N(M) \end{bmatrix}.$$

At operation block 706, a Singular Value Decomposition (SVD) is applied on M. In particular, applying SVD on M, a result of $M = USV^T$ is obtained in which $U = [u_1 \, u_1 \, \ldots \, u_{3N}]$ and $V = [v_1 \, v_1 \, \ldots \, v_M]$. U and V are two unitary 3N×3N and M×M matrices and $S = \text{diag}(\sigma_1, \ldots, \sigma_{3N})$ is the diagonal matrix of the positive and monotonically increasing singular values $\sigma_k$. Following this decomposition, M now becomes:

$$M = \sum_{k=1}^{3N} \sigma_k U_k v_k^T.$$

At operation 708, the sum for M is truncated from 3N to p terms, which results in an optimal least squares approximation of the matrix M given a fixed budget of p vectors. This is equivalent to approximating each column vector of M (i.e. each 3D shape in the sequence) by its orthogonal projection onto the linear subspace spanned by the first p vectors $u_1, \ldots, u_p$. These vectors are precisely the remaining p deformation shape vectors $X_k^i$: for k=1, ..., p, $$u_k = \begin{bmatrix} X_k^1 \\ X_k^2 \\ \vdots \\ X_k^N \end{bmatrix}.$$

The resulting model of principal shape vectors is suitable for the monocular tracking stage. For instance, if a user produces a variety of facial expressions, the facial expressions can be tracked based on facial expressions that have been exposed to the system during the learning stage 210. It should be noted that that since the vectors $u_k$ are unitary, the shape coefficients $\alpha_n^k$ appearing in Equations 1 and 2 are in units of the mean shape $X_o^i$. In one embodiment, the units are in centimeters and four principal shape vectors are used to cover most common facial expressions (e.g., mouth and eyebrow movements). Nevertheless, the number of principal shape vectors used can change based on the diversity of facial expressions performed for tracking.

Figure 4:
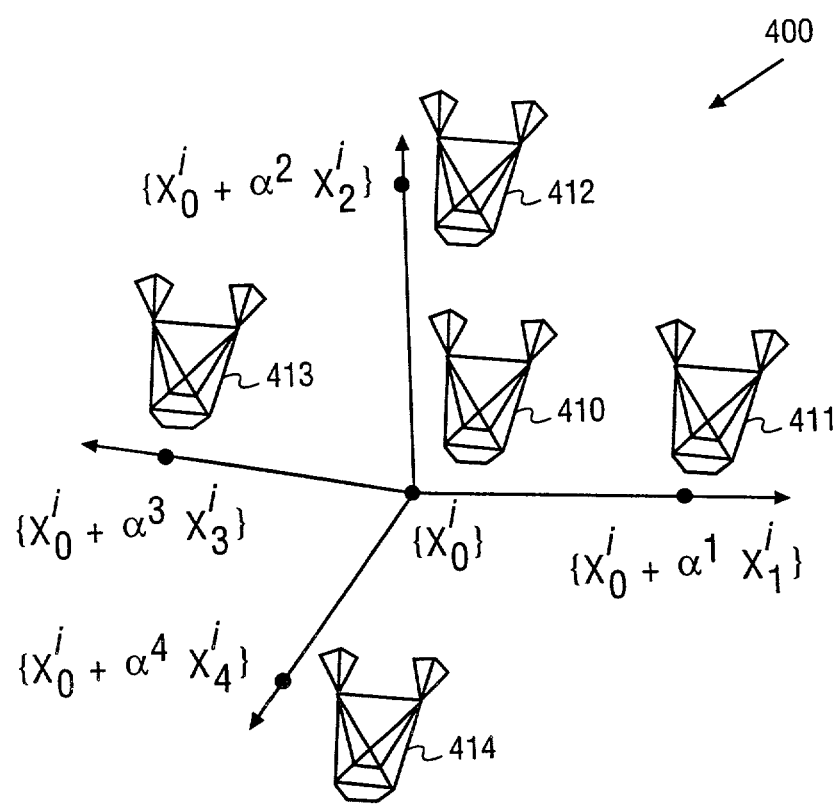
FIG. 4 illustrates a four dimensional space of exemplary deformations learned from stereo input sequences.

Referring back to FIG. 4, a four dimensional space of deformations 411 through 414 are illustrated in which the deformations are computed from the stereo sequence shown in FIG. 3. As shown in FIG. 4, the principal shape vectors can correspond to combinations of four main facial movements, e.g., smile, open/close mouth, left and right raised eyebrows.

Monocular Tracking

Figure 8:
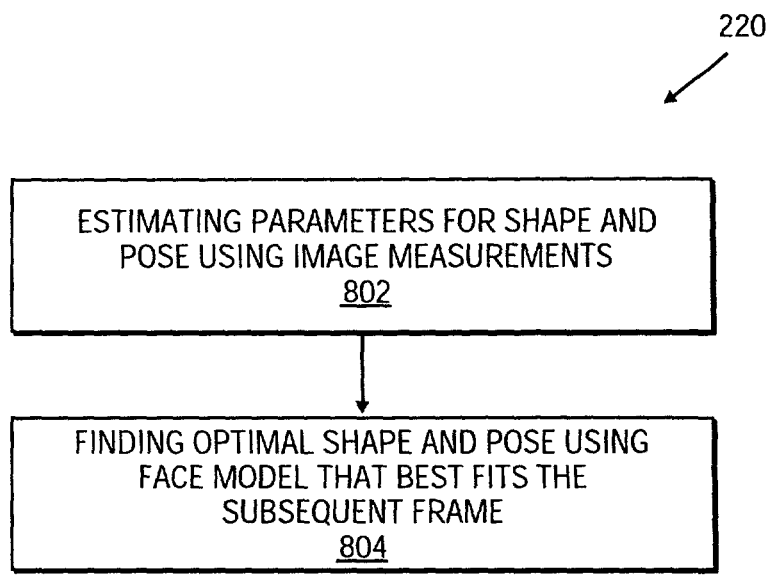
FIG. 8 illustrates a flow diagram to perform monocular tracking in FIG. 2 according to one embodiment.

FIG. 8 illustrates a flow diagram of the operation 220 of FIG. 2 to perform monocular tracking using the computed-model in the learning stage 210 according to one embodiment. Initially, operation 220 begins at operation block 802 for an image sequence such as that shown in FIG. 5.

At operation 802, parameters for shape and pose using image measurements are estimated from the image sequence. In particular, optical flow tracking techniques can be used to compute translational displacement of every point in an image given two successive frames, e.g. frames 1 and 2. Each image point can then be processed independently. Here, for model-based tracking, all the points in the model are linked to each other through the parameterized 3D model given by Equation 1. Thus, the parameters defining the 3D model configuration are estimated all at once from image measurements. Such parameters include $\overline{\alpha}_n$ for shape and $\{\omega_n, t_n\}$ for pose.

At operation 804, an optimal shape and pose are sought using a face model that best fits the subsequent frame. For instance, assume that the face model has been tracked from the first frame of the sequence $I_1$ to the $(n-1)^{th}$ frame $I_{n-1}$. The objective is then to find the optimal pose $\{\omega_n, t_n\}$ and deformation $\overline{\alpha}_n$ of the face model that best fit the subsequent frame $I_n$ to perform monocular tracking. The following description describes how to find the optimal pose and deformation for monocular tracking.

To find the optimal pose and deformation, minimization of a cost function $C_n$ is used in which the minimum is achieved by the following tracking solution Equations 4 and 5:

$$C_n = \sum_{i, ROI} \begin{Bmatrix} (1-e)(I_n(x_n^i) - I_{n-1}(x_n^i - 1))^2 + \\ e(I_n(x_n^i) - I_1(x_1^i))^2 \\ x_n^i = \pi_i(\overline{\alpha}_n, \varpi_n, t_n), \end{Bmatrix} \begin{array}{l} \text{Equation 4} \\ \\ \text{Equation 5} \end{array}$$

where $\pi_i$ is the model-based image projection map defined in Equation 2. The summation for Equation 4 is performed over small pixel windows, e.g., Region of Interest (ROI), around every image point $x_n^i$, $x_{n-1}^i$ and $x_1^i$.

In one embodiment, the first term in Equation 4 is a standard matching cost term, that is, the first term measures overall image mismatch between two successive images at the model points. The second term, however, measures image mismatch between the current image $I_n$ and the first image $I_1$. This additional term weakly enforces every facial feature to appear the same on the images from the beginning to the end of the sequence (in an image neighborhood sense). As such, it avoids tracking drifts and increases robustness. It is referred to as drift monitoring energy term.

The two energy terms are weighted relative to the other by the scalar variable "e." In one embodiment, the variable e=0.2, which is to emphasize for tracking cost over monitoring cost. Thus, tracking is equivalent to estimating the optimal pose and deformation update vectors $d\tilde{\omega}=\tilde{\omega}_n-\tilde{\omega}_{n-1}$, $dt=t_n-t_{n-1}$ and $d\overline{\alpha}=\overline{\alpha}_n-\overline{\alpha}_{n-1}$. This is achieved by setting the derivative of $C_n$ with respect to $d\overline{\alpha}$, $d\tilde{\omega}$ and $dt$ to zero $$\frac{\partial C_n}{\partial_s} = 0, \text{ where } s = \begin{bmatrix} d\overline{\alpha} \\ d\tilde{\omega} \\ dt \end{bmatrix}.$$

Equation 6

Equation 6 is thus solved for "s" while assuming small motion between two consecutive frames. Let $I_{ti}$ be the extended temporal derivative defined as follows:

$$I_{ti}(x_{n-1}^j) = I_n(x_{n-1}^j) - ((1-\epsilon)I_{n-1}(x_{n-1}^j) + \epsilon I_1(x_1^j)).$$

Equation 7

The temporal derivative function $I_{ti}$ is in fact evaluated in the neighborhood of the point $x_{n-1}^i$. Note that if $\epsilon=0$, Equation 7 reduces to the true temporal difference $I_{ti}=I_n-I_{n-1}$. If $\epsilon>0$, the image patch on the previous image $I_{n-1}$ is averaged with that of the first frame, i.e., second row of Equation 7. The resulting patch is used as a reference for the next image $I_n$. This process effectively helps the monocular tracking operation "remember" the original appearance of the feature as it was selected on the first image thereby improving robustness and reducing drifts.

Next, let $I_{xi}$ be x and y image derivatives (image gradient) of image $I_n$ in the neighborhood of $x_{n-1}^i$:

$$I_{xi} = \frac{\partial I_n}{\partial x} = \left[\frac{\partial I_n}{\partial_x} \frac{\partial I_n}{\partial_x}\right].$$

Let $\nabla I_i$ be the derivative of the image brightness $I_n$ with respect to s in the neighborhood of $x_{n-1}^i$ as S=0:

$$\nabla I_i = \frac{\partial I_i}{\partial_s} = \frac{\partial I_n}{\partial x}\frac{\partial \pi_i}{\partial_s} = I_{xi}\frac{\partial \pi_i}{\partial_s}.$$

The resulting matrix $\nabla I_i$ is a size of $1\times(p+6)$ since $I_{xi}$ and $$\frac{\partial \pi_i}{\partial s}$$

are of respective sizes as $1\times 2$ and $2\times(p+6)$. The optimal shape and pose update vector "s" that satisfies Equation 6 is then:

$$s = -G^{-1}b,$$

Equation 8 where the $(p+6)\times(p+6)$ matrix G and the $(p+6)\times 1$ vector b are given by:

$$G = \sum_{i=1}^{N} \sum_{ROI} \nabla I_i^T \nabla I_i$$

$$b = \sum_{i=1}^{N} \sum_{ROI} I_{ti} \nabla I_i^T.$$

Here, a unique tracking solution "s" is computed for the overall model all at once, while in its original form, each image point is processed individually. A 3D model is used for tracking that is built from real data and parameterized with few coefficients. For s to be computable, the matrix G must be of the rank p+6. Roughly, each point in the 3D model brings either zero, one or two scalar observation constraints depending on whether it falls in a textureless region, an edge region, or a fully textured region in the images. In one embodiment, the total number of constraints collected over all the points must then be larger than or equal to p+6=10 to make the 3D model good for tracking.

Once "s" is computed, pose and deformation are known at time frame n. In one embodiment, the same procedure can be reiterated multiple times (e.g., 4 or 5 times) at the fixed time frame n to refine the estimate. The same overall process is then repeated over the subsequent frames. In one embodiment, initialization of the 3D model parameters is done manually by first localizing the N=19 facial features on the first image $I_1$. A small optimization is then performed for computing the initial pose and deformation parameters $$\{\tilde{\omega}_1, t_1, \overline{\alpha}_1\}$$

that make the image projection of the model match the manually selected points.

It should be noted that the region of interest (ROI) of each model point is not kept constant throughout the sequence. Instead, its size and geometry are recomputed at every frame based on the distance (depth) and orientation (local surface normal) of the point in space. The resulting regions of interest are small parallelograms as shown in FIG. 5. In particular, points that face away from the camera are declared "non visible", have a zero-size region of interest assigned to them, and therefore do not contribute to the tracking update.

Thus, a method and two-stage system for 3D tracking of pose and deformation, e.g., of the human face in monocular image sequences without the use of invasive special markers, have been described. The first stage of the system learns the spaces of all possible facial deformations by applying Principal Component Analysis on real stereo tracking data. The resulting model approximates any generic shape as a linear combination of shape basis vectors. The second stage of the system uses this low-complexity deformable model for simultaneous estimation of pose and deformation of the face from a single image sequence. This stage is known as model-based monocular tracking.

The data-driven approach for model construction is suitable for 3D tracking of non-rigid objects and offers an elegant and practical alternative to the task of manual construction of models using 3D scanners or CAD modelers. In addition, creating a model from real data allows for a large variety of facial deformations to be tracked with less parameters than handcrafted models and leads to increased robustness and tracking accuracy. Furthermore, the system exhibits very promising generalization properties in enabling tracking of multiple persons with the same 3D model, which constitutes a major improvement over most other face tracking systems that require a different model for each user to track.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for image processing comprising:
   obtaining stereo data based on input image sequences from of varying facial expressions:
   building a three-dimensional (3D) model using the obtained stereo data to obtain principal shape vectors; and
   tracking a second input image sequence using the 3D model to approximate a linear combination of the principal shape vectors of a facial expression in the second input image sequence, wherein the second input image sequence is a monocular image sequence.

2. The method of claim 1, wherein the building of the 3D model includes processing the obtained stereo data using a Principal Component Analysis (PCA).

3. The method of claim 2, wherein the processed stereo data using PCA allows the 3D model to approximate a generic shape as the linear combination of the shape basis vectors.

4. The method of claim 1, wherein the tracking of the monocular image sequence includes tracking of a monocular image sequence of facial deformations using the built 3D model.

5. A computing system comprising:
   an input unit to stereo data based on input image sequences from of varying facial expressions; and
   a processing unit to build a three-dimensional (3D) model using the obtained stereo data to approximate a generic shape as a linear combination of shape basis vectors and track a second input image sequence using the 3D model to approximate a linear combination of the principal shape vectors of a facial expression in the second input image sequence, wherein the second input image sequence is a monocular image sequence.

6. The computing system of claim 5, wherein the processing unit is to process the obtained stereo data using a Principal Component Analysis (PCA).

7. The computing system of claim 6, wherein the processed stereo data using PCA allows the 3D model to approximate a generic shape as the linear combination of the shape basis vectors.

8. The computing system of claim 5, wherein the processing unit is to track a monocular image sequence of facial deformations using the built 3D model.

9. A non-transitory machine-readable medium providing instructions, which if executed by a processor, causes the processor to perform an operation comprising:
   obtaining stereo data based on input image sequences from of varying facial expressions:
   building a three-dimensional (3D) model using the obtained stereo data to approximate a generic shape as a linear combination of shape basis vectors; and
   tracking a second input image sequence using the 3D model to approximate a linear combination of the principal shape vectors of a facial expression in the second input image sequence, wherein the second input image sequence is a monocular image sequence.

10. The machine-readable medium of claim 9, further providing instructions, which if executed by the processor, causes the processor to perform an operation comprising: processing the obtained stereo data using a Principal Component Analysis (PCA).

11. The machine-readable medium of claim 10, further providing instructions, which if executed by the processor, causes the processor to perform an operation comprising:
   approximate a generic shape as the linear combination of the shape basis vectors based on the processed stereo data using PCA.

12. The machine-readable medium of claim 9, further providing instructions, which if executed by the processor, causes the processor to perform an operation comprising: tracking of a monocular image sequence of facial deformations using the built 3D model.

* * * * *